July 10, 1945.  R. J. SULLIVAN ET AL  2,380,271
METHOD FOR OBTAINING HIGH PRESSURE DISTILLATE SAMPLES
Filed Feb. 2, 1942

Robert J. Sullivan
Joe Miller
INVENTORS

BY J. G. McKean
ATTORNEY

Patented July 10, 1945

2,380,271

UNITED STATES PATENT OFFICE 2,380,271

METHOD FOR OBTAINING HIGH PRESSURE DISTILLATE SAMPLES

Robert J. Sullivan and Joe Miller, Houston, Tex., assignors to Standard Oil Development Company, a corporation of Delaware Application February 2, 1942, Serial No. 429,157

4 Claims. (Cl. 73—421)

The present invention is directed to a method of obtaining samples of fluid from high pressure wells.

Many petroleum wells are known as high pressure distillate or condensate wells and have the characteristic that the fluid produced has a high gas-oil ratio. Sometimes, it is commercially profitable in a field of such wells to pass the output to a gasoline plant in order to separate the normally gaseous constituents. The desirability of obtaining suitable samples from condensate wells to assist in determining the most effective use of the production of such wells will be apparent.

The present invention relates to a method of obtaining representative samples of products from high pressure distillate wells in sufficient amount to allow one to evaluate the products which will be produced in full scale operation. The present invention further relates to a method which will separate the products normally present in the "wild" gasoline obtained in a commercial gasoline plant from normally uncondensable gases, such as methane, in sufficient quantities to allow the samples to be fractionated and utilized in pilot plant operations.

Figure 1:
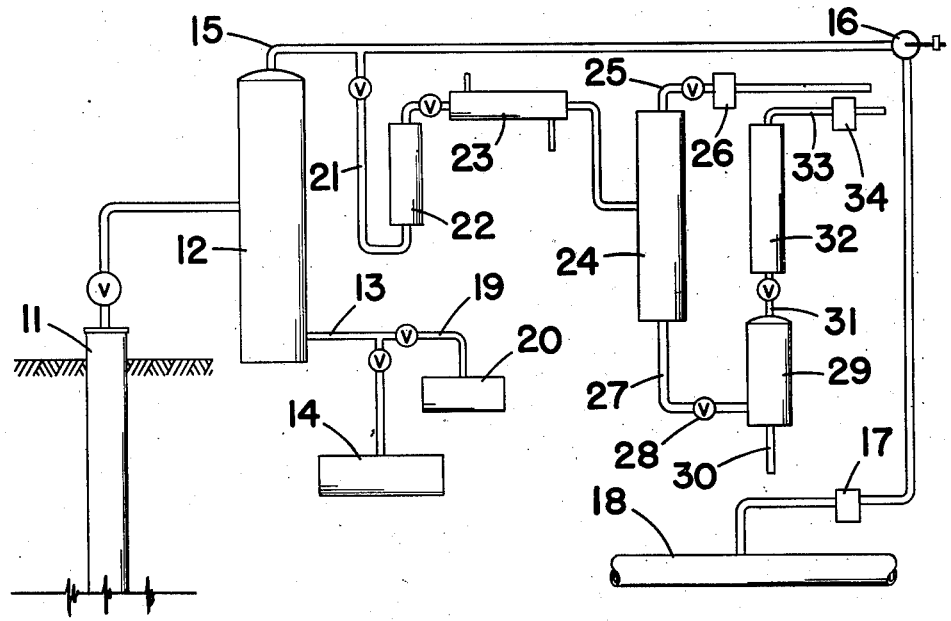
Figure 2:
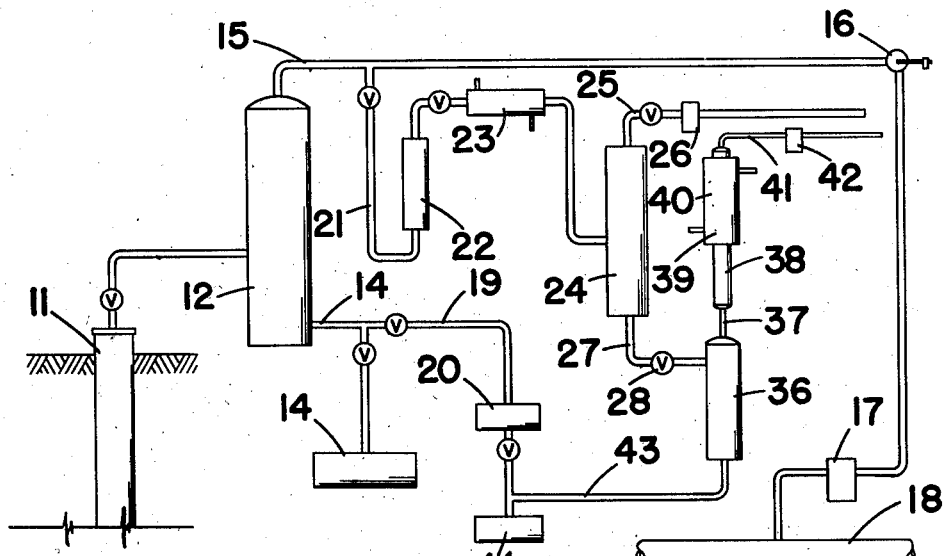

Other objects and advantages of the present invention may be seen from the following description taken in conjunction with the drawing in which Fig. 1 is a diagrammatic illustration in the form of a flow sheet of a preferred embodiment for carrying out the method of the present invention; and Fig. 2 is a diagrammatic illustration showing an alternate arrangement.

Referring specifically to the drawing and first to Fig. 1, a high pressure distillate or condensate well 11 discharges into a conventional field separator 12. The liquid accumulated within the separator may be withdrawn through drawoff line 13 which discharges into storage tank 14. From the upper portion of the separator a line 15 is arranged to remove the gaseous fraction. This line contains a regulator 16 and meter 17. Conventionally, line 15 will discharge into a pipe line, indicated in the drawing by section 18, which conveys the gaseous products to an oil field torch or a commercial or domestic consumer.

In accordance with the present invention, drawoff line 13 is provided with a branch 19 discharging into a suitable container 20. Container 20 serves to collect a bottom sample of the desired size from the separator. From the gaseous discharge line 15 of the separator is also arranged a branch 21 to convey a portion of the gaseous products through a suitable dryer 22 and chiller 23 into a high pressure vessel 24. From the upper end of pressure vessel 24 extends a drawoff line 25 provided with a meter 26. From the bottom of pressure vessel 24 extends a drawoff line 27 which passes through a reducing valve 28 into another collecting vessel 29. Vessel 29 is provided with a drawoff line 30 to remove liquid constituents therefrom, and a gaseous drawoff line 31 which connects the upper portion of the vessel to charcoal-filled absorption tower 32. From the upper end of the absorption tower a line 33 is provided to remove the gases therefrom, whence they pass through a meter 34 to a suitable collecting or disposing means (not shown).

In taking a sample in accordance with the present invention it is necessary first to make a preliminary run, using separator 12 and discharging gaseous material at high pressure through line 15 and liquid through line 13. The reading of meter 17 is obtained during this preliminary step so that the volume of gas per volume of liquid deposited in the separator will be known. The ratio of gas to oil produced by the well is known as the gas-oil ratio of the well.

In almost every case condensate wells are capable of producing a large volume of fluid. In order for the gas-oil ratio of the well to remain constant, substantial amounts of fluid must be withdrawn from the well. If an attempt is made to produce such wells at low rates, the ratio of liquid and gas produced will not remain constant, but instead the well will produce slugs of liquid, causing the gas-oil ratio of the well to be variable. In obtaining representative samples from a well it is impossible to transport apparatus capable of handling large volumes of fluid. Accordingly, in practicing the present invention only a small portion of the gaseous fraction removed from separator 12 will be subjected to cooling and fractionation for the isolation of liquefiable hydrocarbons.

After the gas-oil ratio of the well has been obtained a portion of the gaseous material discharged through line 15 will be drawn off and treated to separate liquefiable constituents. A refrigerant, such as solid carbon dioxide and acetone, will be placed around cooling coil 23 and the gaseous mixture withdrawn by line 21 allowed to pass through the cooling coil.

The gaseous mixture first flows through dryer 22 which is filled with a suitable drying agent, such as calcium chloride, and the dried gaseous materials are then passed through cooling coil 23 where, as stated above, they are chilled by indirect heat exchange with a mixture of solid carbon dioxide and acetone. This intense chilling at high pressure liquefies all except the very lightest gases, and the liquid mixture is passed to vessel 24 which will usually be maintained under a high pressure at a very low temperature.

It has been found desirable to operate vessel 24 at a pressure of approximately 500 pounds per square inch at a temperature of $-50°$ F. Materials which remain gaseous at such a pressure and temperature are removed through line 25 and passed through orifice meter 26 so that their volume may be indicated. The liquefied constituents from vessel 24 are drawn off through line 27, passing through reducing valve 28 into vessel 29 which is maintained at substantially higher temperatures and lower pressures than vessel 24. Various constituents remaining liquid in vessel 29 are removed via drawoff line 30 and vapors pass overhead through line 31 and through absorbing vessel 32.

The absorbing vessel is preferably filled with a conventional solid absorbent, such as charcoal, and removes vapors from the fluid mixture flowing therethrough. The smaller molecular weight materials are not absorbed and are discharged through line 33 and meter 34.

Generally speaking, it has been found desirable to use an absorbent tower 32 containing enough absorbent material so that the full amount of liquid capable of being absorbed which is passed to this vessel during a given run will not exceed that which is capable of being absorbed by the absorbent material. Under such circumstances, after a run is completed, the spent absorbent is removed from the vessel and distilled to remove the liquid constituents absorbed thereby. However, under some conditions, it will be desirable to use more than one absorbent tower, and accordingly a plurality of absorbent towers may be used and the liquid constituents removed therefrom when the run is completed.

When a run is made as above described, three liquid fractions will be obtained, that from vessel 20, that drawn off from vessel 29 through line 30, and that recovered from absorbent vessel 32. In order to determine the proper proportion of the liquid fractions to be mixed together, the readings of meters 17, 26 and 34 are added together, and the volume of liquid material obtained from vessels 29 and 32 when in a vapor state will be estimated and added to the meter reading. This sum gives the total amount of gaseous materials coming from separator 12. The gas-oil ratio of the well already being known, it will be a simple matter to mix to the fractions obtained from vessels 29 and 32 the proper amount of liquid from distillate drum 20 to obtain a typical sample of the materials produced by the well which may be utilized by a gasoline plant. In other words, there is added to the liquid separated from the gaseous stream diverted through line 21 an amount of bottoms from separator 13 equal to the amount of liquid separated in vessel 12 from a volume of gas equal to that diverted through line 21. The composition of such a sample corresponds to that which would be obtained were the condensate well operated at such a rate as to produce an output of uniform composition and the entire output passed into vessel 12 and the overhead from this vessel then passed through line 21 and in sequence through units 22, 23, 24, 29 and 32, and all of the recovered liquid from these several units mixed together to form a sample. The composite sample obtained will be sufficiently large to enable various commercial tests, such as the antiknock test, to be run, thereby indicating the value of the liquid product which may be obtained from the well. It is preferred to obtain a ten gallon sample of liquid for making such tests.

As an example in utilizing the present invention, in the testing of one field, separator 12 was operated under a pressure of 800 pounds per square inch, vessel 24 under a pressure of 500 pounds per square inch and a temperature of $-50°$ F. and vessel 29 under a pressure of 300 pounds per square inch and a temperature of $80°$ F. Under these conditions, it was necessary to pass approximately 420,000 cubic feet of gas through the apparatus in order to obtain ten gallons of a typical sample of the liquid.

Under usual conditions of operation, a gaseous fraction removed through line 21 and passed through the various vessels will have removed therefrom at least 98% of pentane and heavier hydrocarbons. A substantial amount of the butane will be removed in the operation. If it is desirable to obtain a more complete recovery of the liquefiable constituents, an absorbent tower similar to 32 may be attached to line 25 and the recovery of pentane and heavier hydrocarbons will be substantially 100% complete. However, as large amounts of gaseous material are removed through line 25, a relatively large absorption tower is necessary for this purpose and the increased recovery is generally not sufficient to make this additional step worthwhile.

In Fig. 2 is disclosed another embodiment of the present invention. In this figure the apparatus corresponds with that shown in Fig. 1 up to reducing valve 28 in line 27. Fluid passing through valve 28 is discharged into vessel 36 having an opening 37 at its upper end to which is attached reflux condenser 38 provided with a suitable jacket 39 in which is arranged a suitable refrigerant 40. The reflux condenser recovers the heavier hydrocarbons as liquid constituents and allows the lighter hydrocarbons to be discharged as gases through line 41 containing meter 42. The liquid accumulating in vessel 36 is discharged through drawoff line 43 also connected to sample drum 20, line 43 discharging into a suitable vessel 44 from which a representative liquid sample may be withdrawn as desired. It will be apparent that the device shown in Fig. 2 eliminates the distillation step for recovering liquids from a solid absorbent which is necessary in the device shown in Fig. 1. Under some circumstances such a simplification of the process will be found desirable.

Although specific embodiments of the present invention have been described, these embodiments have been given for purposes of illustration and not by way of limitation. It will be apparent that changes may be made in the above described apparatus without involving invention, and it is our intention to embrace such changes by hereto appended claims.

We claim:

1. A method of obtaining a representative sample from a high pressure distillate well comprising the steps of producing the well at such a rate as to maintain a substantially constant gas-oil ratio, passing the output of the well into a separator maintained under conditions to separate the output into an overhead fraction and a bottoms fraction for a known interval of time, determining the ratio of the overhead fraction to the bottoms fraction, diverting a small portion of the overhead fraction through a drying zone, a chilling stage and into a second separating zone maintained at a high pressure and low temperature, removing the bottoms from said second separating zone and passing it into a third separating zone maintained at a lower pressure and a higher temperature, removing the bottoms from said third separating zone as a liquid fraction, determining the volume of the diverted portion of gas, determining from such volume and the gas-oil ratio the volume of liquid separated in the first separating zone corresponding to the volume of the diverted gas and combining such a volume of liquid from the first separating zone with the liquid fraction from the third separating zone.

2. A method in accordance with claim 1 in which said first separating zone is operated under a pressure of approximately 800 pounds per square inch, said second separating zone is operated under a pressure of approximately 500 pounds per square inch and a temperature of −50° F. and said third separating zone is operated under a pressure of approximately 300 pounds per square inch and 80° F.

3. A method in accordance with claim 1 in which the overhead from said third separating zone is passed through a solid absorbent and in which the solid absorbent is treated to remove absorbed liquid which is combined with the bottoms from the third separating zone and with the bottoms from the first separating zone.

4. A method in accordance with claim 1 in which the overhead from said third separating zone is refluxed and the liquid from said refluxing zone returned to the third separating zone and mixed with the bottoms therein.

ROBERT J. SULLIVAN.
JOE MILLER.